United States Patent
Cocchi et al.

(10) Patent No.: US 11,140,911 B2
(45) Date of Patent: Oct. 12, 2021

(54) MACHINE FOR LIQUID OR SEMI-LIQUID FOOD PRODUCTS

(71) Applicant: ALI GROUP S.r.l.—CARPIGIANI, Cernusco sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco sul Naviglio (IT)

( * ) Notice: Subject to any disclaimer, the term of this patent is extended or adjusted under 35 U.S.C. 154(b) by 0 days.

(21) Appl. No.: 15/928,820

(22) Filed: Mar. 22, 2018

(65) Prior Publication Data

US 2018/0279645 A1    Oct. 4, 2018

(30) Foreign Application Priority Data

Mar. 31, 2017    (IT) .................. 102017000035879

(51) Int. Cl.
*A23G 9/22*        (2006.01)
*A23G 9/16*        (2006.01)
(Continued)

(52) U.S. Cl.
CPC ............ *A23G 9/224* (2013.01); *A23G 9/045* (2013.01); *A23G 9/16* (2013.01); *A23G 9/222* (2013.01);
(Continued)

(58) Field of Classification Search
CPC .......... A23G 9/224; A23G 9/045; A23G 9/16; A23G 9/222; F28D 7/0075; F28D 7/024;
(Continued)

(56) References Cited

U.S. PATENT DOCUMENTS 1,622,376 A  *  3/1927  Davenport ............ F25B 39/024
                                                   165/147
2,183,509 A  *  12/1939 Smith .................... F25D 31/002
                                                   165/118
(Continued)

FOREIGN PATENT DOCUMENTS

EP        0311158 A2    4/1989
EP        1450114 A1    8/2004
(Continued)

OTHER PUBLICATIONS

Italian Search Report dated Nov. 30, 2017 for counterpart Italian Application No. IT 2017000035879.

*Primary Examiner* — Tho V Duong
(74) *Attorney, Agent, or Firm* — Shuttleworth & Ingersoll PLC; Timothy Klima (57) ABSTRACT

A machine for making liquid or semi-liquid products, including a first container adapted to contain a basic mixture, having an inside surface and an outside surface and equipped with a stirrer disposed inside the first container; a thermodynamic system comprising a circuit for circulating a heat exchanger fluid and a first heat exchanger associated, in use, with walls of the first container, the first heat exchanger is defined by at least one element which is fixable, in use, to the outside surface of the first container, having an open cavity, extending uninterruptedly and defining, when coupled with the outside surface, a channel for circulating heat exchanger fluid, the element also having at least one inlet and one outlet for the heat exchanger fluid.

11 Claims, 5 Drawing Sheets

(51) Int. Cl.
*A23G 9/04* (2006.01)
*F28D 7/00* (2006.01)
*F28D 7/02* (2006.01)
*F28F 13/12* (2006.01)

(52) U.S. Cl.
CPC ........... *F28D 7/0075* (2013.01); *F28D 7/024* (2013.01); *F28F 13/125* (2013.01); *F28F 2275/06* (2013.01)

(58) Field of Classification Search
CPC . F28D 7/08; F28D 7/026; F28D 7/082; F28D 7/085; F28D 7/087; F28D 9/0012; F28D 9/04; F28F 13/125; F28F 13/08
USPC ......................................................... 165/147
See application file for complete search history.

(56) References Cited

U.S. PATENT DOCUMENTS

| | | | | |
|---|---|---|---|---|
| 2,413,233 A * | 12/1946 | Johnson | ................ | F25D 23/061 62/442 |
| 2,671,658 A * | 3/1954 | William | ................... | F27B 1/24 165/101 |
| 3,318,376 A * | 5/1967 | Vihl | ..................... | B01J 19/0013 165/147 |
| 4,004,634 A * | 1/1977 | Habdas | ................... | F28D 7/106 165/155 |
| 4,295,255 A * | 10/1981 | Weber | ................... | B21D 53/027 228/157 |
| 4,460,278 A * | 7/1984 | Matsubara | .......... | B01F 7/00908 366/149 |
| 5,477,704 A * | 12/1995 | Wright | .................... | B04B 15/02 62/381 |
| 5,601,143 A * | 2/1997 | Binder | ...................... | B01L 7/02 165/61 |
| 5,799,726 A | 9/1998 | Frank | | |
| 5,845,512 A | 12/1998 | Chase et al. | | |
| 6,054,103 A * | 4/2000 | Mandel | ................... | B01F 7/246 422/208 |
| 2005/0061495 A1* | 3/2005 | Schubert | ................ | F28D 7/026 165/177 |
| 2007/0245766 A1* | 10/2007 | Younkle | ............... | B67D 1/0862 62/393 |
| 2008/0128526 A1* | 6/2008 | Otake | .................... | F24H 1/208 237/2 B |
| 2010/0064717 A1* | 3/2010 | Burn | ........................ | F25C 1/14 62/353 |

FOREIGN PATENT DOCUMENTS

| | | | | |
|---|---|---|---|---|
| EP | 3095332 A1 | | 11/2016 | |
| FR | 2261494 A1 | | 9/1975 | |
| GB | 507505 A | | 6/1939 | |
| GB | 1014916 A | | 12/1965 | |
| GB | 1124076 A | * | 8/1968 | ............ F28F 13/003 |

* cited by examiner

MACHINE FOR LIQUID OR SEMI-LIQUID FOOD PRODUCTS

This application claims priority to Italian Patent Application IT 102017000035879 filed Mar. 31, 2017, the entirety of which is incorporated by reference herein.

BACKGROUND OF THE INVENTION

This invention relates to a machine for liquid or semi-liquid food products (in particular, designed to make soft ice cream or shake type products) and to a method for making a machine for liquid or semi-liquid products.

As is known, machines for producing liquid and/or semi-liquid products are provided with a container which is adapted to contain the mixture being processed and which is internally equipped with a stirrer.

A thermal system, generally comprising a refrigerant fluid, is adapted to cool and/or heat the walls of the container.

It is noted that these machines comprise a heat exchanger, associated with the container and operatively coupled with the thermal system, which is adapted to remove heat from, or add heat to, the walls of the container.

It should be noted that the heat exchanger generally comprises a coil consisting of a suitably bent tubular element mounted to the container.

One of the requirements of manufacturers of machines for making liquid or semi-liquid products is to have a machine which is capable of ensuring efficient heat exchange with the product it is processing (inside the container) and which is at once particularly simple, quick to construct and inexpensive.

SUMMARY OF THE INVENTION

This invention therefore has for an aim is to provide a machine for liquid or semi-liquid food products which is capable of meeting the requirement just mentioned.

More specifically, the aim of this invention is to provide a food processing machine for liquid or semi-liquid products which can ensure that the food product it is processing can be cooled and/or heated in a particularly efficient manner (that is to say, the machine offers high cooling and/or heating capacity per unit area).

Another aim of this invention is to provide a food processing machine for liquid or semi-liquid products which is relatively easy to construct and inexpensive.

According to the invention, this aim is achieved by a machine for making liquid or semi-liquid food products forming the object of the invention and comprising the technical features set out in one or more of the appended claims.

BRIEF DESCRIPTION OF THE DRAWINGS

The technical features of the invention, with reference to the above aims, are clearly described in the claims below and its advantages are apparent from the detailed description which follows, with reference to the accompanying drawings, which illustrate a non-limiting example embodiment of the invention, and in which:

DESCRIPTION OF THE PREFERRED EMBODIMENTS

With reference to the accompanying drawings, the numeral 1 denotes a machine for making liquid or semi-liquid products of the soft ice cream or shake type.

The machine 1 for making liquid or semi-liquid products comprises:

a first container 3 adapted to contain a basic mixture and equipped with a stirrer 4 disposed inside the first container 3;

a thermodynamic system comprising a circuit for circulating a heat exchanger fluid and a first heat exchanger 6 associated, in use, with walls of the first container 3.

The first container 3, which is adapted to contain a basic mixture, has an inside surface 3A (in contact with the product) and an outside surface 3B (not in contact with the product).

The first heat exchanger 6 is defined by at least one element 7 which is fixable, in use, to the outside surface 3B of the first container 3, having an open cavity 8, extending uninterruptedly and defining, when coupled with the outside surface 3B a channel for circulating heat exchanger fluid.

The cavity 8 also has, at opposite ends of it, at least one inlet I and one outlet U for the heat exchanger fluid.

Figure 1:
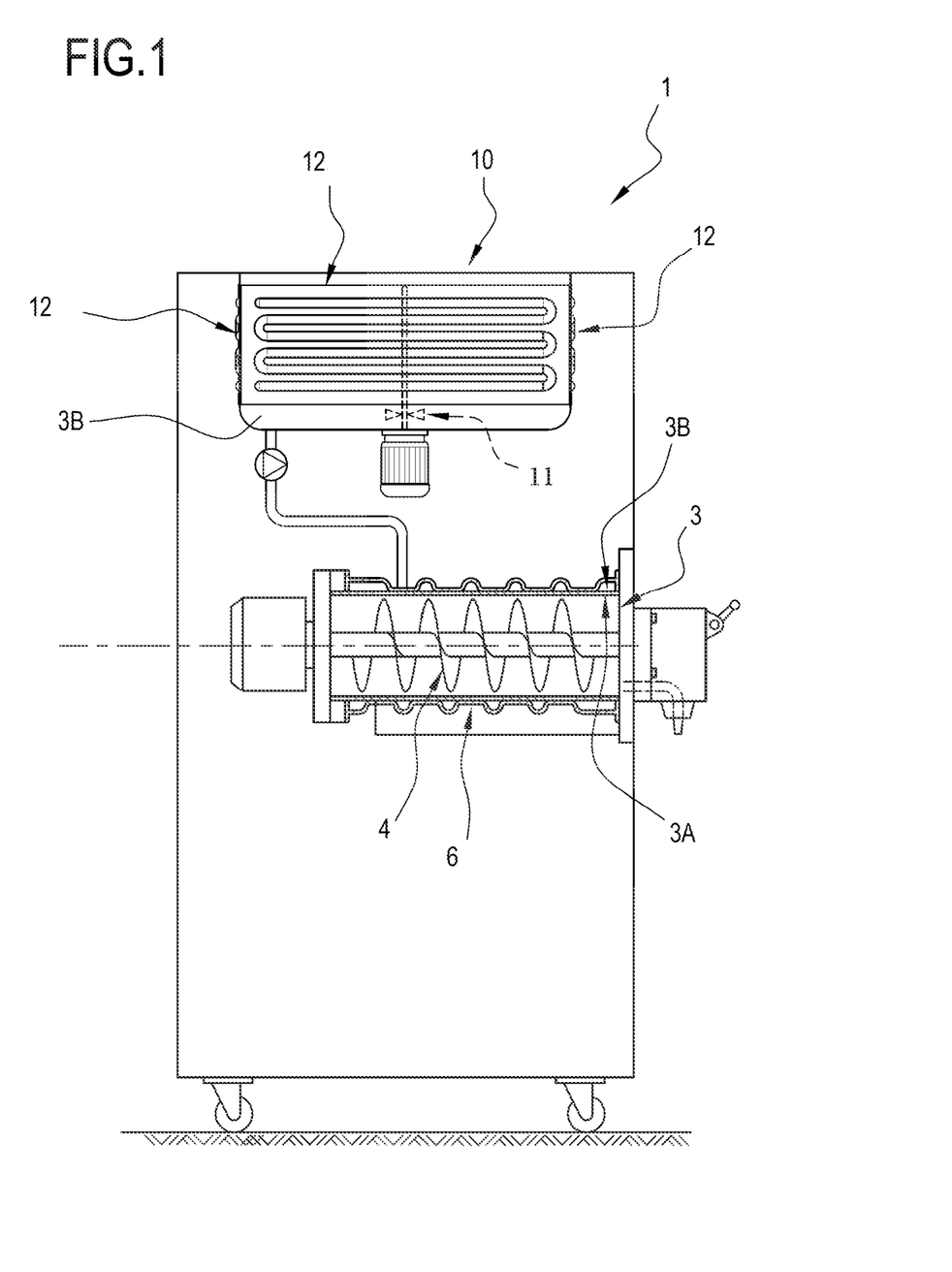
FIG. 1 is a schematic side view illustrating by way of example a first embodiment of the machine of this invention for making liquid or semiliquid products.

In the description below, the embodiment illustrated in FIG. 1 is described first and then the embodiment illustrated in FIG. 2.

As illustrated in FIG. 1, the first container 3 has a cylindrical structure and the at least one element 7 has a cylindrical structure and is mounted on the outside of the first container 3.

It should be noted, more precisely, that the element 7 has a tubular structure.

Preferably, the at least one element 7 is welded to the first container 3.

Preferably, the cross section of the cavity 8 has the shape of a circular sector.

According to another aspect, not illustrated with reference to the aforesaid embodiment, the cavity 8 extends to define a path comprising parallel lines whose respective ends are joined by curved lines.

According to another aspect, the cavity 8 extends helically (along the main direction of extension of the element 7).

According to another aspect, the element 7 is made of metallic material.

It should be noted that according to another aspect, the element 7 is undetachably coupled to the outside surface 3B of the first container 3.

Still more preferably, the element 7 is welded to the outside surface 3B of the first container 3.

It should be noted that the cavity 8 extends outwards in such a way as to form a protuberance of the outwardly protruding element 7.

Figure 2:
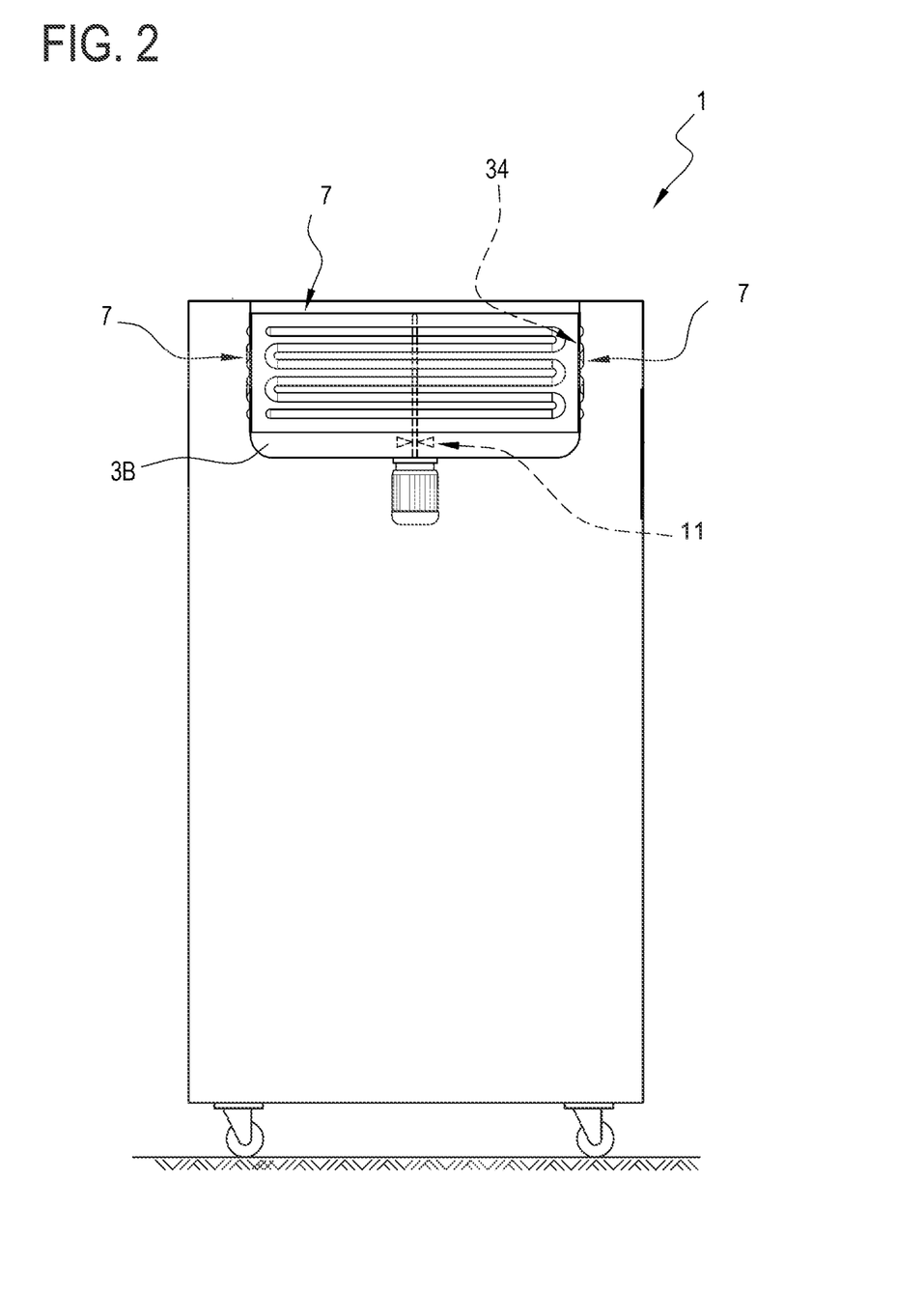
FIG. 2 is a schematic side view illustrating by way of example a second embodiment of the machine of this invention for making liquid or semiliquid products.

In the embodiment illustrated in FIG. 2, where the top container is now designated as the first container, the first exchanger comprises a plurality of elements 7.

Each of the elements 7 is provided with a cavity 8 extending uninterruptedly to define a channel for circulating the fluid. Each of the elements 7 can be associated (stably, preferably undetachably) to at least one portion of walls 9 (more precisely, of the outside surface 3B) of the first container.

According to another aspect, each element 7 extends substantially planarly in an extension plane.

Figure 5:
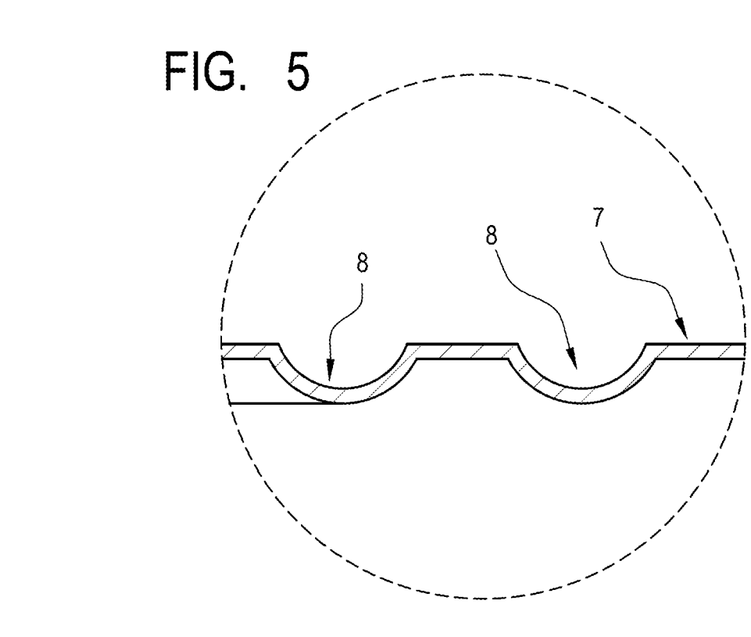
FIG. 5 shows by way of example a view of the detail K from FIG. 4.
Figure 6:
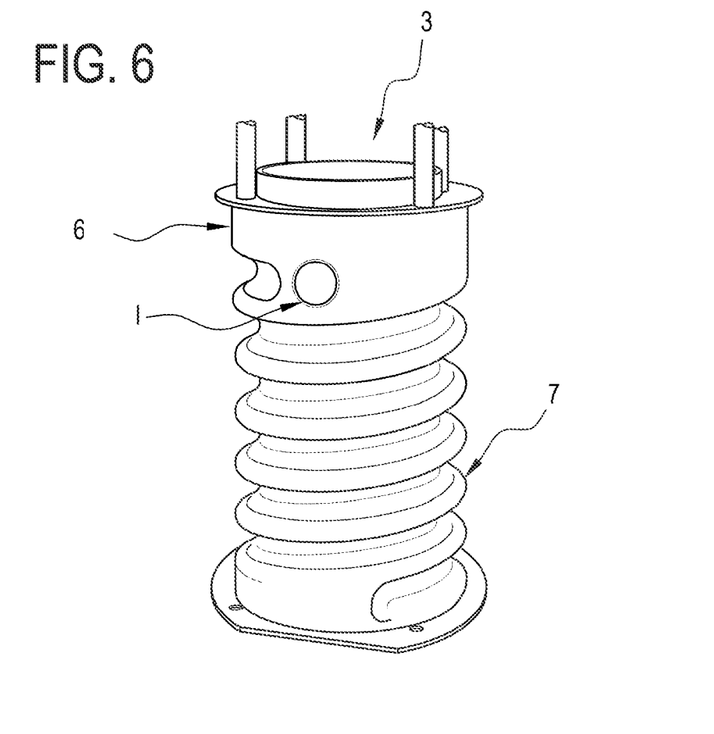
FIGS. 6 and 7 are, respectively, a front view and a side view illustrating by way of example a detail of the machine of FIG. 1.
Figure 7:
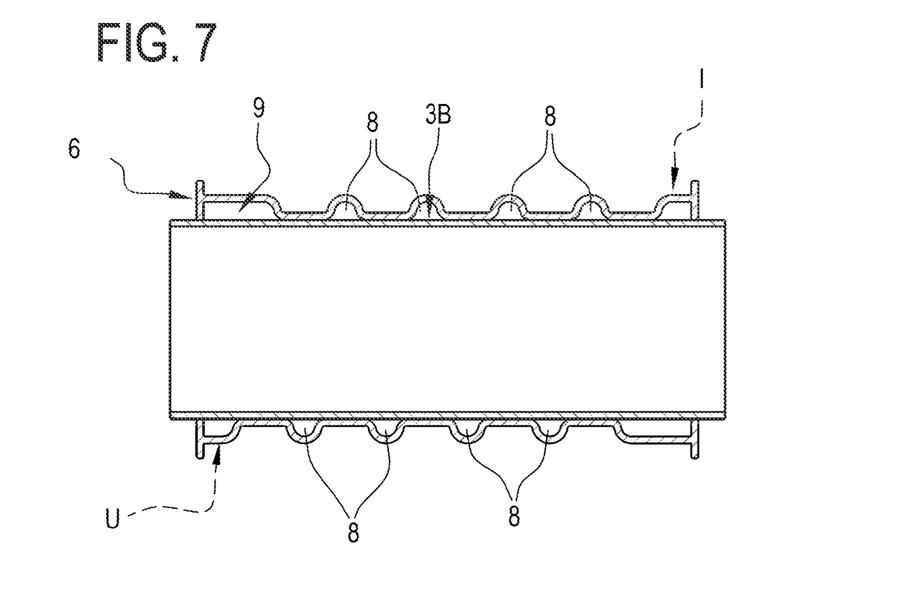

Preferably, the cross section of the cavity 8 in a plane at right angles to the extension plane has the shape of a circular sector (as shown clearly in FIG. 5).

According to another aspect, the cavity 8 extends to define a path comprising parallel lines 8A whose respective ends are joined by curved lines 8B, and such parallel lines and curved lines can lie in a same plane.

According to another aspect, the elements 7 are made of metallic material.

According to another aspect, the elements 7 are, in use, coupled to the walls 9 (outside surface 3B) of the first container 3 in such a way that the cavity 8 is open towards (that is, on the side of) the walls 9 of the first container 3 and more precisely, open towards the outside surface 3B.

It should be noted that the fluid circulation channel is thus defined by the combination of the outside surface 3B with the inside walls of the cavity 8.

It should be noted that according to another aspect, the elements 7 are coupled to the side walls 9 of the first container 3.

Preferably, the elements 7 are undetachably coupled to the side walls 9 of the first container 3.

Still more preferably, the elements 7 are welded to the side walls 9 of the first container 3.

Preferably, according to one aspect, each element 7 is coupled to one side wall 9 of the first container 3.

It should be noted that the cavity 8 extends outwards in such a way as to form a protuberance of the outwardly protruding element 7.

According to another aspect, the machine 1 comprises:

a second container 10 connectable, in use, to the first container 3 to receive basic product therefrom, and equipped with a respective internal stirrer 11;

a second heat exchanger 12 associated with the second container 10 to remove heat from, or release heat to, the walls 12 of the second container 10.

Preferably, the second heat exchanger 12 is connected to a thermodynamic system (the thermodynamic system or another system).

Figure 3:
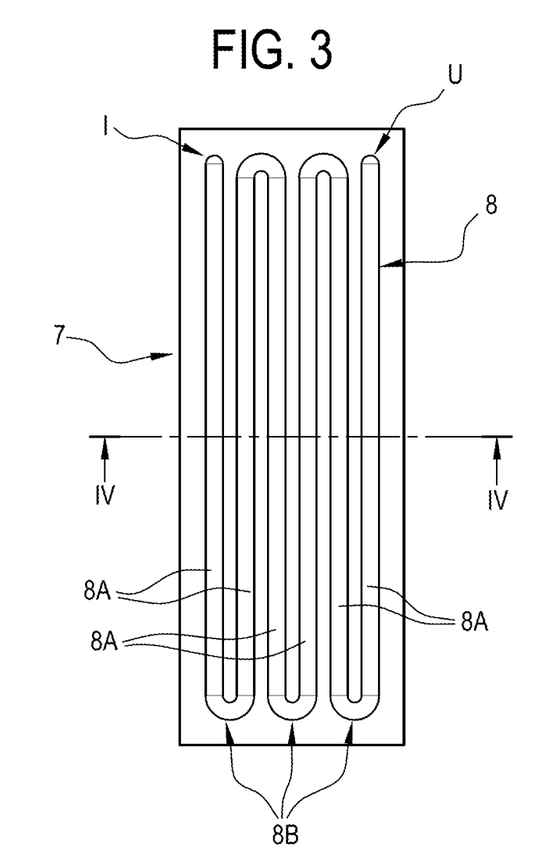
FIGS. 3 and 4 are, respectively, a front view and a side view illustrating by way of example a detail of the machine of FIG. 1 or 2.
Figure 4:
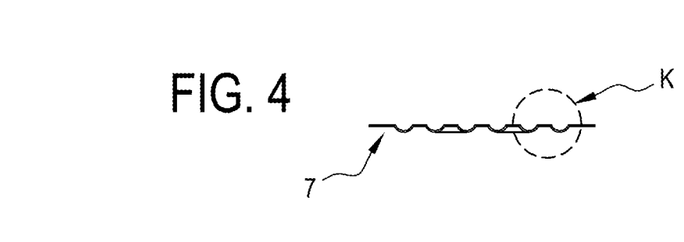

FIG. 3 illustrates one of the elements 7.

The cavity 8 is clearly shown in FIG. 3.

It should, in particular, be noted that in use, the element 7 is fixed to the outside of the walls 9 (that is, to the outside surface 3B) of the first container 3, with the cavity 8 open towards (that is, in the direction of) the outside surface 3B.

More specifically, it should be noticed that in each embodiment, the heat exchange surface between fluid and outside surface 3B, is particularly large compared to traditional, prior art heat exchangers, where the channel is defined by a tubular coil with a circular cross section (in which case, the exchange of heat occurs through an extremely limited section of the lateral surface of the channel).

More precisely, compared to traditional channels of known type (rectangular or circular), the shape of the cavity 8 minimizes the surface which faces the outside (where heat exchange has no useful effect) and maximizes the surface which faces the first container 3 (which heats and/or cools the liquid or semi-liquid product).

According to another aspect, the second container 10 is a horizontal cylinder.

It should be noted that the thermodynamic system preferably comprises a further heat exchanger (functioning as a cold or hot thermodynamic source, depending on whether the first exchanger 6 is working as a hot source or a cold source, respectively).

Preferably, the thermodynamic system also comprises a compressor.

It should be noted that the heat exchanger fluid is preferably a refrigerant fluid.

It should be noted that, preferably, the channels of the elements 7, associated with different side walls, are connected to each other to define a circulation path for the heat exchanger fluid.

According to one aspect, the outlet U of at least one of the elements 7 is connected to the inlet I of another of the elements 7 to define a series connection between the one and the other element 7. That way, the one and the other element 7 are traversed by the same flow.

According to yet another aspect, the inlet I of at least one of the elements 7 is connected to the inlet I of another of the elements 7 and the outlet U of the at least one of the elements 7 is connected to the outlet U of the other of the elements 7, to define a parallel connection between the one and the other element 7.

According to another aspect of it, the invention defines a method for making a machine for producing liquid or semi-liquid products. The method comprises the following steps:

preparing a first container 3 having an inside surface 3A and an outside surface 3B, adapted to contain a basic mixture and equipped with a stirrer 4 disposed inside the first container 3;

preparing a thermodynamic system comprising a circuit for circulating a heat exchanger fluid and a first heat exchanger 6 associated, in use, with walls of the first container 3, where the step of preparing a first heat exchanger 3 comprises the steps of:

preparing at least one element 7, forming in the at least one element 7 a cavity 8, extending uninterruptedly to define a channel for circulating the heat exchanger fluid between an inlet I and an outlet U and further comprising the step of undetachably associating the at least one element 7 with at least one portion of the outside surface 3B of the first container 3 in such a way that the cavity 8 faces towards the outside surface 3B of the first container 3, to define, together with the outside surface 3B, the channel for circulating the fluid.

According to another aspect, the step of undetachably associating the at least one element 7 with at least one portion of the outside surface 3B of the first container 3 comprises a step of welding the element 7 to at least one portion of the outside surface 3B of the first container 3.

Described below are other aspects relating to the structure of the cavity 8 or the configuration of the container 3.

According to one aspect, the cross section of the at least one cavity 8 is variable in size along its direction of extension.

Preferably, the cross section of the at least one cavity 8 is variable in size along its direction of extension and increases in size between the inlet I and the outlet U.

In effect, it should be noted that the heat exchanger fluid which enters the evaporator, that is, the heat exchanger 6, tends to expand, and thus to occupy more space, along the path between inlet and outlet, and the fact that the size of the cavity 8 increases in the direction from the inlet to the outlet, facilitates the expansion process.

According to another aspect, the at least one cavity 8 has corrugations on an outside surface of it.

In other words, the cavities 8 are suitably and irregularly shaped on the outside of them in order to avoid laminar flow and improve heat exchange, thereby increasing the efficiency of the evaporator (hence, the heat exchange coefficient).

According to another aspect, the cavity 8 is a microchannel or minichannel.

According to another aspect, the at least one cavity 8 has an equivalent diameter of between 0.2 and 20 mm.

According to this aspect, the machine 1 is advantageously provided with a compact-size heat exchanger 6 capable of exchanging high thermal flows with the product being processed.

According to the aforesaid aspect, the at least one cavity 8 has an equivalent hydraulic diameter of between 0.2 and 20 mm.

Figure 8:
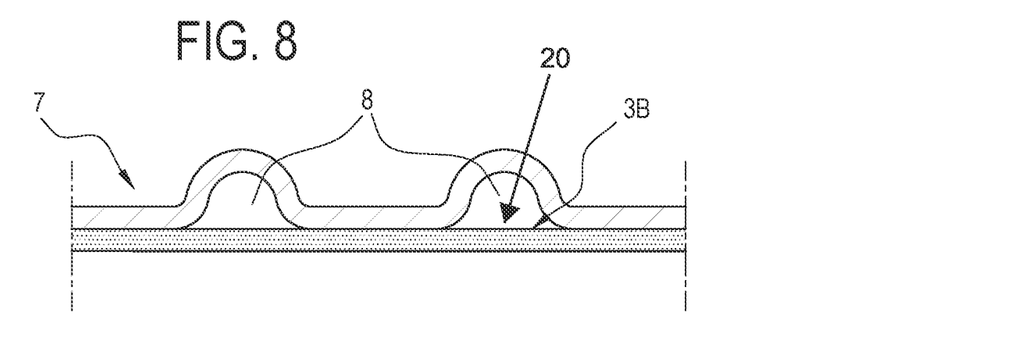
FIG. 8 shows the outside surface 3B is porous.
Figure 9:
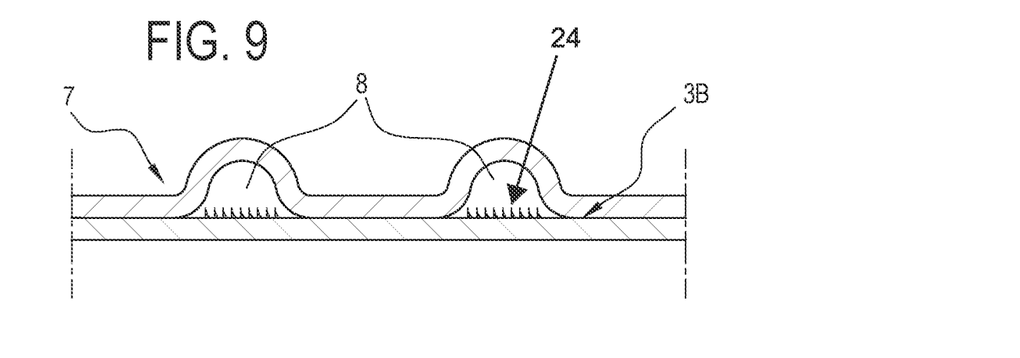
FIG. 9 shows fins in the cavities 8.
Figure 10:
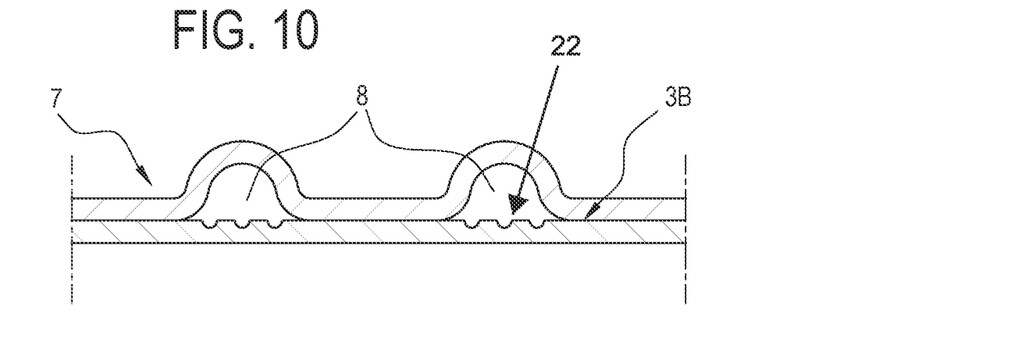
FIG. 10 shows surface hollows in the cavities 8.

According to another aspect, the outside surface 3B of the first container 3 is porous is at 20 (see FIG. 8) or is provided with surface hollows 22 (see FIG. 10) or fins 24 (see FIG. 9). According to this aspect, before the outside surface 3B of the first container 3 is fixed to the element 7, it is optimized by surface treatment in order to improve the heat exchange coefficient.

The method for making a machine for producing liquid or semi-liquid products therefore comprises a step of treating the outside surface 3B of the first container 3.

More precisely, the step of treating the outside surface 3B of the first container 3 comprises a step of increasing the roughness of the surface.

Alternatively, the step of treating the outside surface 3B of the first container 3 comprises a step of creating surface porosity or surface hollows or fins on the outside surface 3B.

It should be noted that the exchanger 6 is an evaporator of a refrigeration system which operates according to a saturated vapor compression cycle.

It should also be noted that the fluid entering the evaporator in the form of saturated mixture and leaving in the form of dry or overheated saturated vapor vaporizes completely at constant temperature and pressure, removing heat from the heat source.

What is claimed is:

1. A machine for making liquid or semi-liquid products, comprising:
    at least one container adapted to contain a basic mixture, having an inside surface, an outside surface, walls and including a stirrer disposed inside the at least one container;
    a thermodynamic system comprising a circuit for circulating a heat exchanger fluid and a heat exchanger operatively connected, in use, with walls of the at least one container,
    wherein the heat exchanger is defined by at least one element which is fixable, in use, to the outside surface of the at least one container, and having at least one open cavity, extending uninterruptedly and defining, when coupled with the outside surface, a channel for circulating heat exchanger fluid, the at least one element also having at least one inlet and at least one outlet for the heat exchanger fluid,
    wherein the at least one element includes a plurality of elements, the at least one open cavity including a plurality of open cavities defining a plurality of channels, the at least one inlet includes a plurality of inlets, the at least one outlet includes a plurality of outlets, with each of the plurality of elements including a respective one of the plurality of open cavities defining a respective one of the plurality of channels, a respective one of the plurality of inlets and a respective one of the plurality of outlets, the plurality of elements being operatively connected respectively with different walls of the at least one container,
    wherein the respective ones of the plurality of channels of the plurality of elements, operatively associated with different ones of the walls respectively, are connected to each other to define a circulation path for the heat exchanger fluid,
    wherein, the respective one of the plurality of outlets of one of the plurality of elements is connected to the respective one of the plurality of inlets of another of the plurality of elements to define a series connection between the one and the other of the plurality of elements such that the one and the other of the plurality of elements are traversed by a same flow of the heat exchanger fluid;
    wherein the at least one open cavity has an equivalent hydraulic diameter of between 0.2 and 20 mm;
    wherein the outside surface of the at least one container is porous;
    wherein each of the plurality of elements extends planarly in an extension plane and a cross section of at least one of the plurality of cavities in a plane at right angles to the extension plane is shaped as a circular sector;
    wherein at least one of the plurality of cavities extends to define a path comprising parallel lines having respective ends joined by curved lines, wherein the parallel lines and curved lines lie in a same plane.

2. The machine according to claim 1, wherein the plurality of elements have a corresponding structure and are fitted on the outside surface of the at least one container.

3. The machine according to claim 1, wherein the plurality of elements are welded to the at least one container.

4. The machine according to claim 1, wherein the plurality of elements are made of a metallic material.

5. The machine according to claim 1, wherein the plurality of elements are coupled to the walls of the at least one container.

6. The machine according to claim 1, wherein each one of the plurality of elements is coupled to one of the walls of the at least one container.

7. The machine according to claim 1, wherein a cross section of at least one of the plurality of cavities is variable in size along its direction of extension.

8. The machine according to claim 1, wherein a cross section of at least one of the plurality of cavities is variable in size along its direction of extension and increases in size between the respective one of the plurality of inlets and the respective one of the plurality of outlets.

9. The machine according to claim 1, wherein at least one of the plurality of cavities has corrugations on an outside surface thereof.

10. A method for making a machine for producing liquid or semi-liquid products comprising the following steps:

preparing at least one container adapted to contain a basic mixture and having an inside surface, an outside surface, walls and including a stirrer disposed inside the at least one container;

preparing a thermodynamic system comprising a circuit for circulating a heat exchanger fluid and a heat exchanger operatively connected, in use, with walls of the at least one container, wherein the step of preparing the heat exchanger comprises the following steps:

preparing at least one element, forming in the at least one element at least one open cavity, extending uninterruptedly to define a channel for circulating the heat exchanger fluid between an inlet and an outlet and further comprising the step of undetachably associating the at least one element with at least one portion of the outside surface of the at least one container in such a way that the cavity faces towards the outside surface of the at least one container, to define, together with the outside surface, the channel for circulating the fluid, wherein the at least one element includes a plurality of elements, the at least one open cavity including a plurality of open cavities defining a plurality of channels with a plurality of inlets and a plurality of outlets, with each of the plurality of elements including a respective one of the plurality of open cavities defining a respective one of the plurality of channels, a respective one of the plurality of inlets and a respective one of the plurality of outlets, the plurality of elements being operatively connected respectively with different walls of the at least one container, wherein the respective ones of the plurality of channels of the plurality of elements, operatively associated with different ones of the walls respectively, are connected to each other to define a circulation path for the heat exchanger fluid, wherein, the respective one of the plurality of outlets of one of the plurality of elements is connected to the respective one of the plurality of inlets of another of the plurality of elements to define a series connection between the one and the other of the plurality of elements such that the one and the other of the plurality of elements are traversed by a same flow of the heat exchanger fluid;

wherein the at least one open cavity has an equivalent hydraulic diameter of between 0.2 and 20 mm;

wherein the outside surface of the at least one container is porous;

wherein each of the plurality of elements extends planarly in an extension plane and a cross section of at least one of the plurality of cavities in a plane at right angles to the extension plane is shaped as a circular sector;

wherein at least one of the plurality of cavities extends to define a path comprising parallel lines having respective ends joined by curved lines, wherein the parallel lines and curved lines lie in a same plane.

11. The method according to claim 10, wherein the step of undetachably associating the at least one element with at least one portion of the outside surface of the at least one container comprises a step of welding the element to at least one portion of the outside surface of the at least one container.

* * * * *